(12) United States Patent
Kagan et al.

(10) Patent No.: US 7,620,856 B2
(45) Date of Patent: Nov. 17, 2009

(54) FRAMEWORK FOR AUTOMATED TESTING OF ENTERPRISE COMPUTER SYSTEMS

(75) Inventors: Dmitry Kagan, Kfar Saba (IL); Noam Dishon, Tel-Aviv (IL); Evgeny Himmelreich, Modiin (IL)

(73) Assignee: SAP Portals Israel Ltd., Ra'anana (IL)

( * ) Notice: Subject to any disclaimer, the term of this patent is extended or adjusted under 35 U.S.C. 154(b) by 406 days.

(21) Appl. No.: 11/647,778

(22) Filed: Dec. 28, 2006

(65) Prior Publication Data

US 2008/0163015 A1    Jul. 3, 2008

(51) Int. Cl.
*G06F 11/00* (2006.01)
(52) U.S. Cl. .......................................... 714/57
(58) Field of Classification Search ............ 714/57
See application file for complete search history.

(56) References Cited

U.S. PATENT DOCUMENTS

| | | | |
|---|---|---|---|
| 7,047,176 B2 * | 5/2006 | Klevans et al. ................. 703/21 |
| 7,080,287 B2 * | 7/2006 | Salem .......................... 714/38 |
| 7,305,466 B1 * | 12/2007 | Kaffine et al. ............... 709/224 |
| 7,496,815 B2 * | 2/2009 | Bhaumik et al. ............. 714/724 |
| 2005/0166094 A1 | 7/2005 | Blackwell et al. |

OTHER PUBLICATIONS

SAP Netweaver®.
Mercury™ LoadRunner®.

* cited by examiner

*Primary Examiner*—Michael C Maskulinski
(74) *Attorney, Agent, or Firm*—Buckley, Maschoff & Talwalkar LLC

(57) ABSTRACT

An automated testing framework enables automated testing of complex software systems. The framework can be configured for test selection, flow definition, and automated scheduled testing of complex computer systems. The framework has facilities for result analysis, comparison of key performance indicators with predefined target values, and test management.

33 Claims, 11 Drawing Sheets

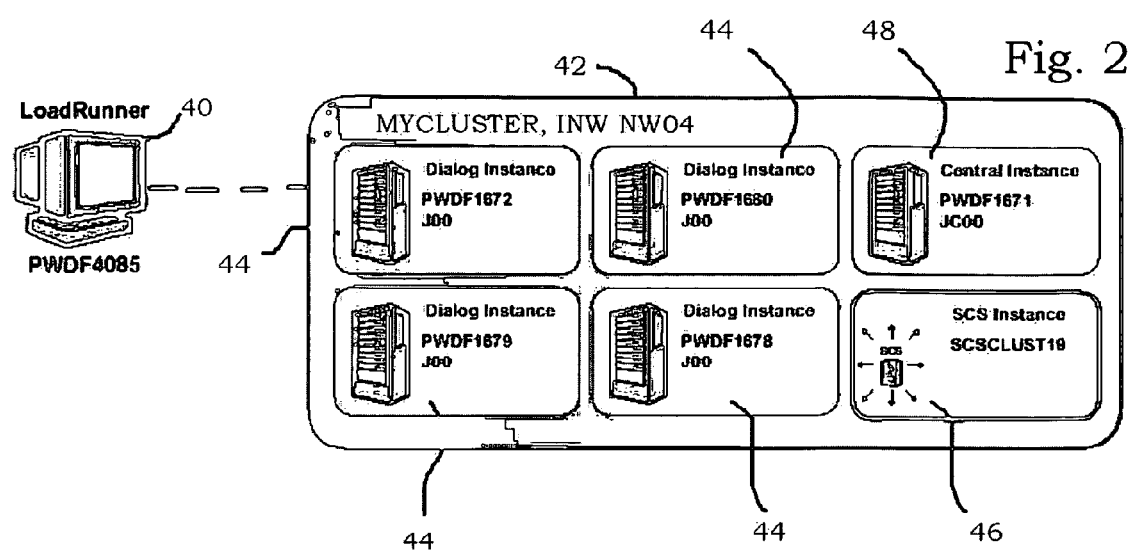
Fig. 2
Fig. 3
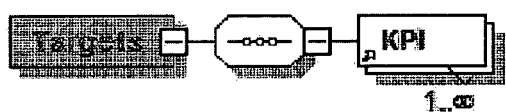

FRAMEWORK FOR AUTOMATED TESTING OF ENTERPRISE COMPUTER SYSTEMS

BACKGROUND OF THE INVENTION

1. Field of the Invention

This invention relates to testing of complex computer systems. More particularly, this invention relates to an automated framework for managing testing of enterprise computer systems.

2. Description of the Related Art

TABLE 1

Acronyms and Abbreviations

| | |
|---|---|
| API | Application Programming Interface |
| BAPI | Business Application Programming Interface |
| CASE | Computer Aided Software Engineering |
| eCATT | Extended Computer Aided Test Tool |
| GC | Garbage Collection |
| GUI | Graphical User Interface |
| J2EE | Java 2 Enterprise Edition |
| JVM | Java Virtual Machine |
| KDL | KPI Description Language |
| KPI | Key Performance Indicator |
| LDAP | Lightweight Directory Access Protocol |
| LR | LoadRunner |
| QTP | Quick Test Professional |
| SCS | SAP Central Services |
| XFL | Extended Flow Language |

Enterprise software systems such as portal-based network environments have become almost essential for operation of large modern businesses, and include a variety of complex software. For example, such environments can now be implemented using SAP NetWeaver®, available from SAP AG, Neurottstraβe 16, 69190 Waldorf, Germany. This technology supports integration and application platform requirements, and facilitates the development, deployment, and administration of enterprise services.

Such systems involve large numbers of modules, often produced by different vendors, and employing diverse operating systems. Implementing and successfully coordinating these systems may require the construction and maintenance of complex landscapes and connection frameworks in order that the user be able to seamlessly access and harness the diverse modules. Furthermore, such modules are continually updated by their producers, which imposes an ongoing requirement for compliance validation and performance optimizations.

In order to enable clients to test its portal technology, SAP provides a tool known as the Extended Computer Aided Test Tool (eCATT), which falls into the category of Computer Aided Software Engineering (CASE) tools. The primary aim is the automatic testing of SAP business processes. Each test generates a detailed log that documents the test process and results, allowing evaluation of the quality of the system being tested. The tool enables automatic testing in a graphical user interface (GUI) in the Microsoft® Windows® and Java™ environments. In order to offer a complete test solution that covers other GUIs, eCATT has interfaces to various third party tools. Typical applications for eCATT include testing transactions, reports, and scenarios, Business Application Programming Interfaces (BAPI), remote systems, databases, applications and GUT'S.

U.S. Patent Application Publication No. 2005/0166094 describes a tool for testing performance of interrelated components of complex software systems. A system known termed an "Automated Multidimensional Traceability Matrix" is proposed to store relationship information between test cases (predetermined scenarios involving a series of specified transactions to test the behavior of one or more software components of the complex software system) and/or individual components of the complex software system. When a component is modified, information in the Automated Multidimensional Traceability Matrix is then accessed to automatically generate a list of test cases that may need to be run to efficiently test the functioning of the complex software system.

SUMMARY OF THE INVENTION

According to disclosed embodiments of the invention, an improved automated testing framework for complex computer systems is provided. The framework can be configured for test selection, flow definition, and automated scheduled testing of complex computer systems. The framework has facilities for result analysis, comparison of key performance indicators (KPI) with predefined target values, test management, and reporting. Through an elaborately developed graphical user interface and wizard, the framework readily accommodates changes in the environment of the system to be tested without need for redefining the test flow.

An embodiment of the invention provides a computer-implemented method for automatically testing data processing system performance, which is carried out using a graphical user interface to establish a configuration of a data processing system to be tested. The configuration includes a network topology and the network elements of the data processing system in the network topology. With the graphical user interface, the method includes selecting resources for testing the data processing system, defining a testing cycle for the configuration, the testing cycle including a series of actions. The method is further carried out by executing the testing cycle using the configuration of the data processing system, and automatically controlling the resources to obtain recorded performance indicators of the data processing system, automatically analyzing the recorded performance indicators, and generating a visual presentation of the performance indicators.

According to aspect of the method, executing the testing cycle includes detecting a system crash.

One aspect of the method includes iterating the testing cycle and comparing results of the iterations.

According to yet another aspect of the method, executing the testing cycle includes detecting an abnormal condition, and responsively thereto performing a predefined sequence of actions.

According to still another aspect of the method, the predefined sequence of actions includes a thread dump.

According to an additional aspect of the method, defining a testing cycle includes identifying key performance indicators in a key performance indicator description language.

According to one aspect of the method, defining a testing cycle includes stating the series of actions in an extendible flow language.

According to aspect of the method, establishing a configuration of a data processing system includes automatically mapping machines and server instances participating in a cluster of the data processing system.

Software product and apparatus for carrying out the method are provided in other disclosed embodiments of the invention.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 2 is a diagram illustrating an exemplary landscape that may be defined using a wizard in accordance with a disclosed embodiment of the invention;

FIG. 3 is a diagram describing a scheme for collection of key performance indicators, in accordance with a disclosed embodiment of the invention;

FIG. 8 is a screen display illustrating a collection of key performance indicators that were measured during a project run, in accordance with a disclosed embodiment of the invention;

FIG. 12 is a screen display showing details of the project runs, in accordance with a disclosed embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Overview

Figure 1:
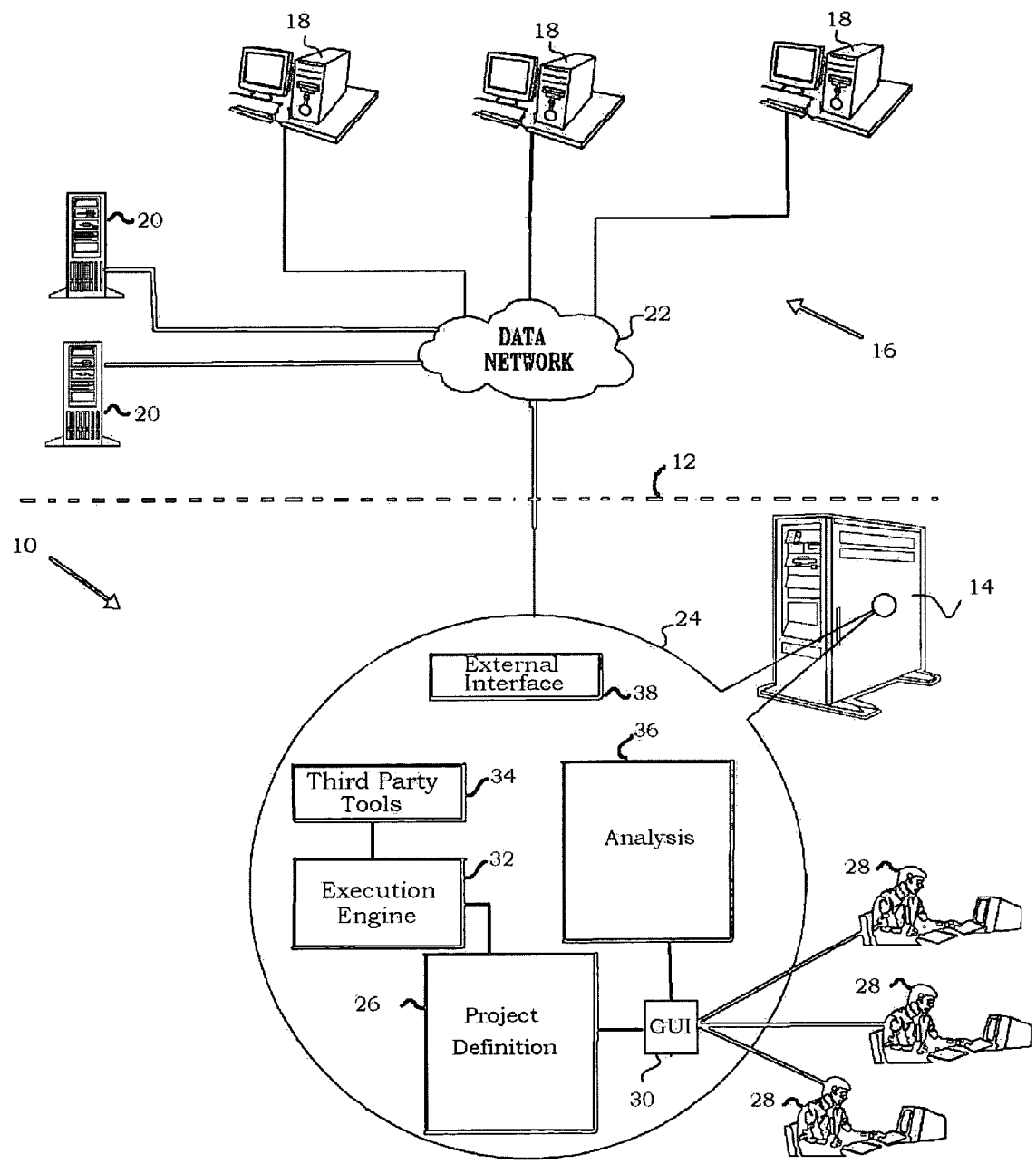
FIG. 1 is a simplified pictorial diagram of a test framework in accordance with a disclosed embodiment of the invention.

Turning now to the drawings, reference is initially made to FIG. 1, which is a simplified pictorial diagram of a test framework 10, which is suitable for carrying out aspects of the invention. In a current embodiment, the test framework 10, shown below a broken line 12, is implemented on a central web-based server 14. Alternatively, the test framework 10 may be implemented as a plurality of computers linked together in a data network. Using the facilities of the system 10, projects can be created and managed, in which test suites execute in real time or on schedule to test performance of a complex computer system 16, indicated representatively above the line 12 as a constellation comprising any number of clients 18 and servers 20, all linked together via a data network 22.

The test framework 10 is programmed with suitable software for carrying out the functions described hereinbelow. Thus, although the test framework 10 is shown as comprising a number of separate functional blocks, these blocks are not necessarily separate physical entities, but rather represent different computing tasks or data objects stored in a memory. These tasks may be carried out in software running on a single processor, or on multiple processors. The software may be provided to the processor or processors on tangible media, such as CD-ROM or non-volatile memory. Alternatively or additionally, aspects of the test framework 10 may comprise a digital signal processor or hard-wired logic.

A block diagram of a software suite 24 is shown, which executes in the server 14. The software suite 24 includes a wizard-based project definition module 26, whose function is to allow one or more operators 28 to create and maintain projects to test aspects of the computer system 16. Interaction between the operator and the software suite 24 occurs via a graphical user interface 30 (GUI).

Once projects are created, test suites are executed under control of an execution engine 32. The execution engine 32 may invoke the services of known third party load testing and performance monitoring tools 34. One of the applications currently included among the tools 34 is Mercury™ LoadRunner®, which is a tool for running load tests and analyzing the load results. An analysis module 36 evaluates results of test suite execution. The analysis module 36 may invoke LoadRunner analysis facilities if needed. Additionally or alternatively, the analysis module 36 may invoke internally developed analysis modules for analyzing test results, e.g., certain memory and error logs, which may not be amenable to LoadRunner. The software suite 24 includes an interface 38 with external tools such as LoadRunner.

The projects defined using the test framework 10 are kept in a database, such that the project can be rerun whenever relevant environment is modified. The graphical user interface 30 provided in the test framework 10 is flexible enough to easily accommodate such modifications without need for laborious manual reconfiguration of the framework or hard coding new test flows.

Project Definition.

Landscape.

A project in the test framework 10 is a basic entity that encompasses a testing scheme, a testing cycle, results analysis, corrective actions, and iteration of the cycle until performance is satisfactory. Typically, a project applies to a particular configuration of a complex computer system being tested, referred to as its "system landscape". The system landscape includes the topology of the system, e.g., its network addresses and access passwords. The system landscape also includes such system components as servers, network elements, their capabilities, and installed software.

A wizard used by the project definition module 26 produces screen displays that enable the user to establish basic properties of a new project. A project name and description are assigned.

The wizard enables the operator to define a landscape, and to select resources to be used to control and evaluate the test flow. One screen display presents a number of machine selections. In a current operating environment, the machines are a LoadRunner machine, a Quick Test Professional (QTP) machine, a Lightweight Directory Access Protocol (LDAP) server and application servers. For some cases, none of the machines is needed. If a SAP cluster is chosen, then at least one SAP-central-services (SCS) instance of each cluster should be selected. The rest of the cluster is automatically discovered and configured. Alternatively, the user can choose to include Microsoft Internet Information Services (IIS) as the application server. The wizard enables an automatic presentation of a mapping of the machines and server instances participating in a cluster of interest that is being tested.

Reference is now made to FIG. 2, which is a diagram illustrating an exemplary landscape that may be defined using a wizard in accordance with a disclosed embodiment of the invention. A LoadRunner machine 40 is attached as a landscape resource to a cluster 42 as a third party tool. The cluster 42 includes dialog instances 44, a SCS instance 46, and a central instance 48.

During project definition, the user selects key performance indicators, typically using the wizard. As explained in further detail below, the user selects the actions he wants to perform and builds a flow. Results of the execution of the flow include KPI's that are produced during the run. For each project, the user may select a file that includes the KPI's he wishes to include. This file, known as a KDL file, is described below. The user has the ability to compose multiple KDL files and may choose one of them or may prefer a pre-defined KDL file. This choice can be done at any time, even after a test has run. Indeed, a KDL file can be composed at a later time and applied retroactively. A specialized view, known as a KPI view, described below may be generated whenever a test is run. This view is derived from test result files.

KPI's available in a current embodiment are presented below in Table 3. The output of the selection step is emitted as a file written in a specialized KPI description language known as KDL, an example of which is provided in Computer Program Listing Appendix 2. KDL is an implementation of XML. A schema for KDL is presented in Computer Program Listing Appendix 6. The use of KDL provides convenient editing capabilities. The output constitutes a template that is later loaded by the test framework 10 when a project is executed. In one aspect of the invention, KDL files may be managed by users at any time after project definition. Furthermore, a project may include many KDL files. Normally one of these is selected for use in a run, and is referenced in the project's report file, "Report.rbl" (see Computer Program Listing Appendix 3). KDL files are versatile and can be shared by many projects that deal with the same key performance indicators.

Reference is now made to FIG. 3, which is a KDL syntax diagram describing a scheme whereby KPI's are collected, in accordance with a disclosed embodiment of the invention.

Example 1

The following example is a commented KPI definition in KDL.

```
<KPI
  id="J2E_STR_T". This is not visible to the End User
  -->
  name="Startup Time"
  <!-- Descriptive name for the KPI - used in reports -->
  group="J2EE"
  <!-- KPI Area (See Table 3) -->
  description=
  "Amount of time the system took to be operative"
  <!-- Descriptor of the KPI for use in reporting.-->
  unit="Sec"
  <!-- Unit of Measurement-->
  good_direction="down"
  <!-
  Indicates whether the KPI target is to be minimized or
  maximized (down indicates minimization)
  -->
  green_value="180"
  <!-
  A value below which the result is considered to be good
    (assuming minimization of the target)
  -->
  yellow_value="300"
  <!-
  threshold, below which the result
  is considered to be marginal. And if above red
  unsatisfactory
  -->
  green_regression="3"
  <!-
  Percent of regression that is considered to be negligible.
  In this example, regression of up to 3% between measurements
  would still be considered as green.
  -->
  yellow_regression="5
  <!-
  Percent of regression that are considered critical. In this
    example, a regression of more than 5% between
    measurements would be considered as red.
  Between 3 and 5 percent, the regression would be marked in
  yellow.
  -->
  "/>
```

Regression testing, referenced in Example 1, is a well-known procedure in performance analysis.

The wizard offers an option to create a project without a landscape. This option is useful, for example, if only off-line analysis is required, e.g., analysis of error or memory logs that are not found on a live system landscape, but rather were imported from a remote system for analysis.

As part of the project definition, the wizard executes a search to determine available installations in the enterprise. If more than one system is installed, the user is invited to select the relevant system on another screen display (not shown).

First Use

The wizard invites the user to choose the first use for the current project. The following concepts are employed in this phase. An "action" means a single operation. A "step" means a sequence of actions. A "flow" means a sequence of steps and actions. The wizard offers several options for the first use of the project:

(1) A "cycle" option indicates that a flow, i.e., a sequence of steps and actions, is to be repeated, and the results combined in a regression test, which will run in periodically, or after each code change.

(2) An "investigation" option allows failed steps to be identified and rerun, without changing any cyclical flows. Results eventually appear in an investigation section of a report.

(3) A "single action" option allows running only one action, rather than a sequence of actions. This option is useful for running designated actions, for example analysis of a log, or when restarting the entire system landscape. This is also useful for off-line analysis.

While the wizard asks the user to select one of the above modes for first use, the user may switch to any of the modes during the life of a project, as described below.

Flow Cycles

Figure 4:
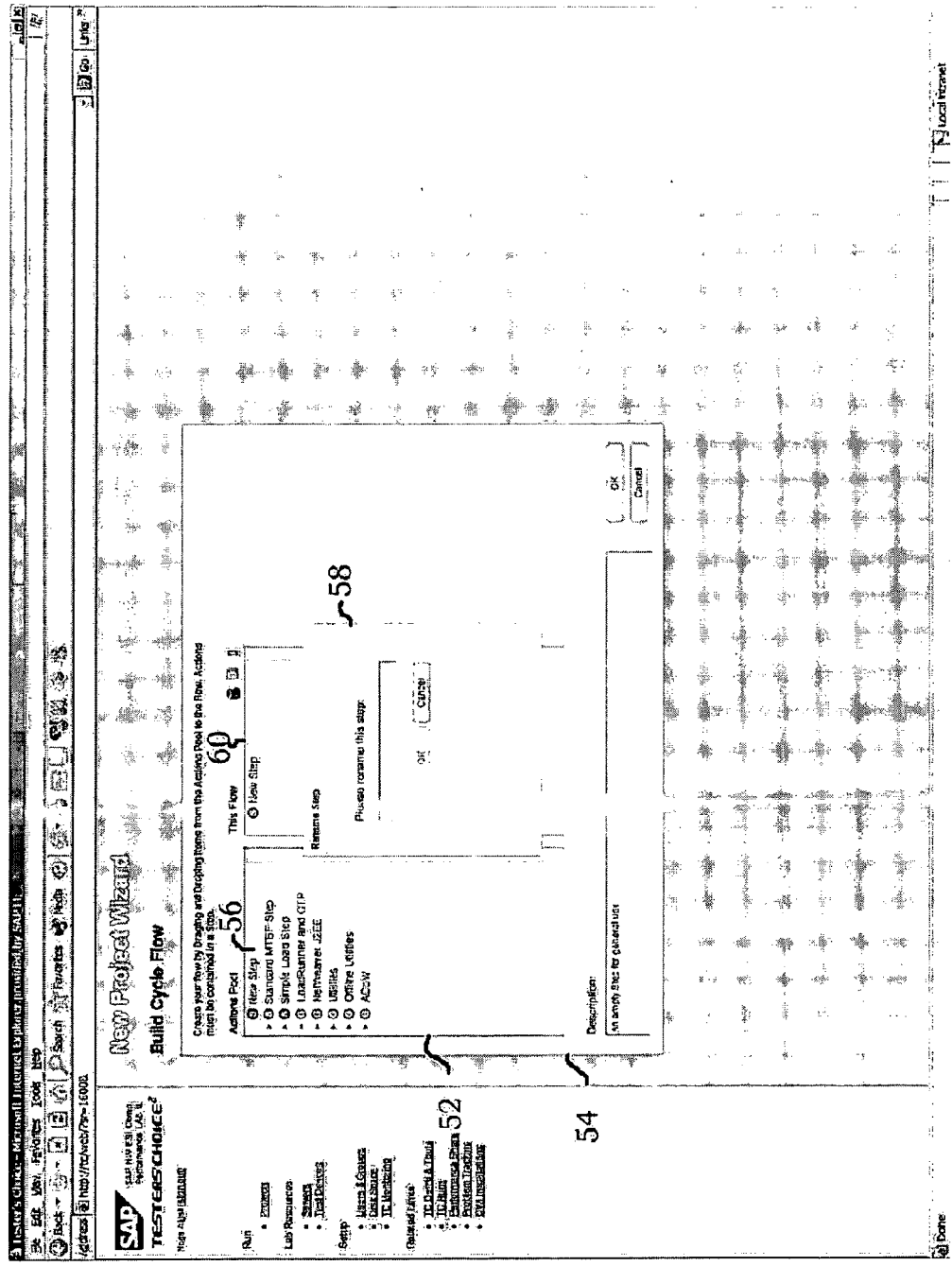
FIG. 4 is another screen display of a wizard used by a project definition module of the system shown in FIG. 1, in accordance with a disclosed embodiment of the invention.

In projects that involve a cycle, the wizard enables the user to define the flow. Reference is now made to FIG. 4, which is a screen display 50 produced by a wizard used by the project definition module 26 (FIG. 1) in accordance with a disclosed embodiment of the invention. A left pane 52 of a dialog box 54 displays a list of predefined steps that are available for selection. Additionally, a selection 56 is available for creating user-defined steps. On the screen display 50 the selection 56 has been chosen, and a smaller dialog box 58 has appeared, inviting the user to assign a name for the step that is to be created. The new step has already appeared under its default name on a right pane 60, which is partially obscured by the dialog box 58.

Figure 5:
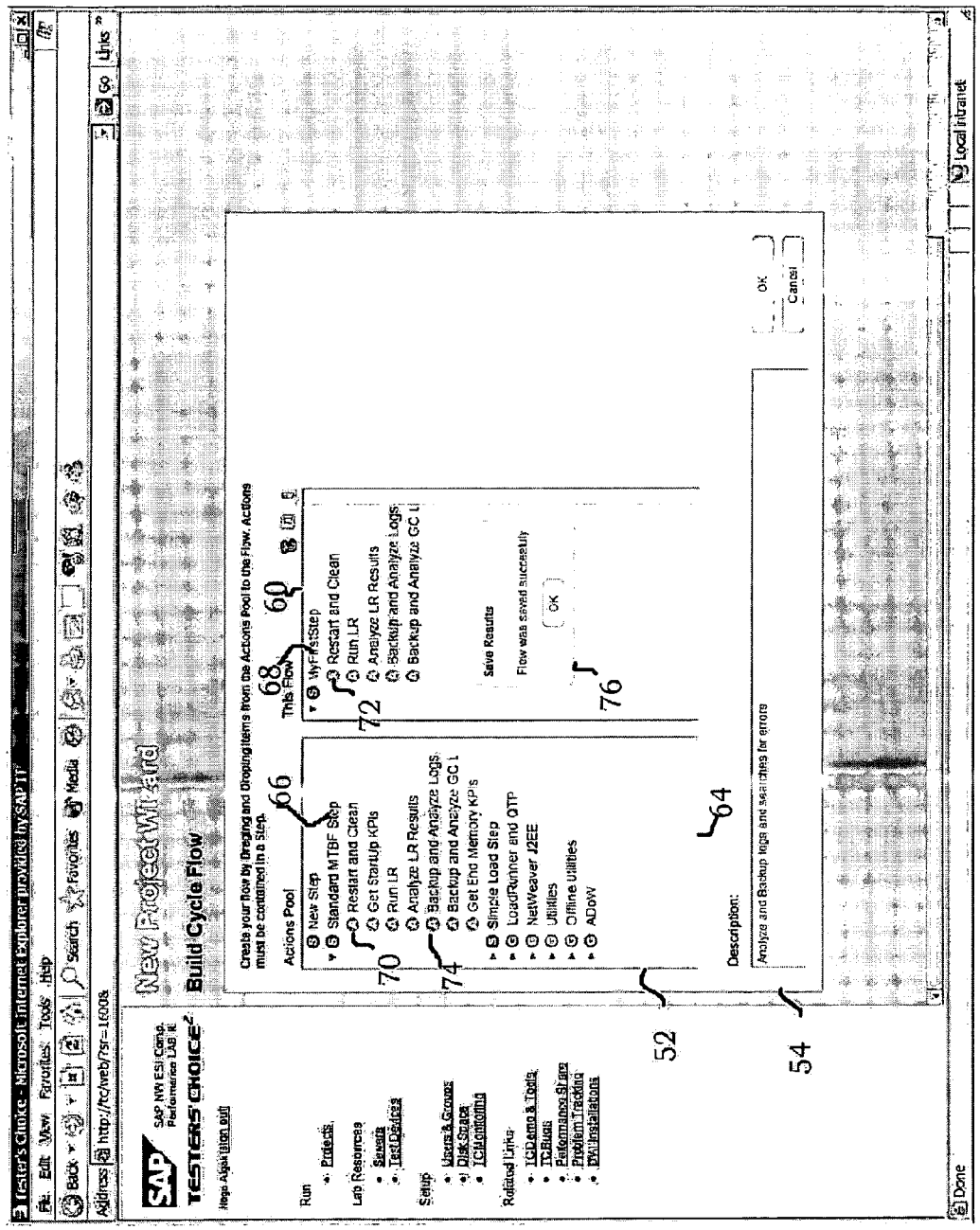
FIG. 5 is another screen display of a wizard used by a project definition module of the system shown in FIG. 1, in accordance with a disclosed embodiment of the invention.

Once the new step has been created, its definition is completed by assignment of actions to be taken. Reference is now made to FIG. 5 illustrating a screen display 62 produced by a wizard used by the project definition module 26 (FIG. 1) in accordance with a disclosed embodiment of the invention. The screen display 62 is similar to the screen display 50 (FIG. 4). In the pane 52, there is an expanded actions pool 64. In the actions pool 64, a predefined step 66, "standard MBTF step," has been further expanded to display several actions. Some of these have been selected and assigned to a newly created step 68, now named "MyFirstStep", using a conventional drag-and-drop technique. For example, an action 70, "Restart and Clean," has been chosen from the pane 52, and appears as a first action 72 of the step 68 in the pane 60. Another action 74, "Backup and Analyze logs" has been selected, and is discussed below. A detailed description of the predefined actions is presented below in Table 2. In FIG. 5, the user has approved his selections, and has saved the result, as confirmed by a popup display 76.

The output of the flow wizard is emitted as a document written in a specialized flow language, known as Extendible Flow Language (XFL). A XFL example is presented in Computer Program Listing Appendix 1. XFL is a specialization of XML. A XML scheme describing XFL is given in Computer Program Listing Appendix 5. Exemplary layout information for a XFL file is given in Computer Program Listing Appendix 7.

Figure 6:
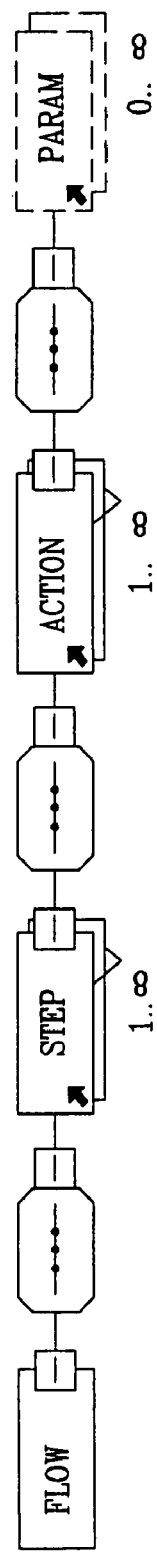
FIG. 6 is a XFL diagram illustrating a scheme of actions, in accordance with a disclosed embodiment of the invention.

XFL has two purposes. First, XFL describes the flow of a project. Reference is now made to FIG. 6, which is a diagram illustrating a XFL scheme of actions that the test framework 10 (FIG. 1) is to perform, in accordance with a disclosed embodiment of the invention.

Figure 7:
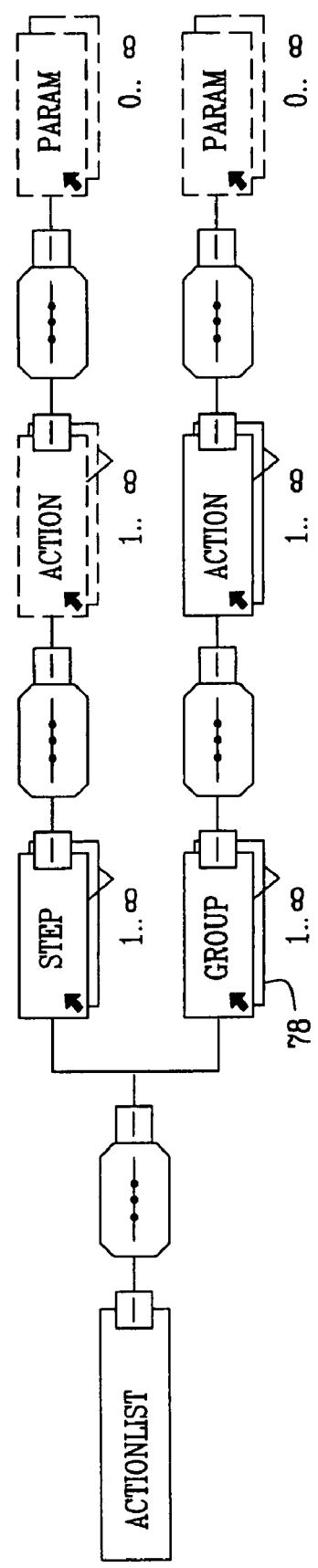
FIG. 7 is a XFL diagram showing actions to be taken by a test frame, in accordance with a disclosed embodiment of the invention.

Second, XFL describes actions available to the test framework 10. Reference is now made to FIG. 7, which is an exemplary diagram showing available actions, and indicating logical groups, e.g. J2EE actions, in accordance with a disclosed embodiment of the invention. A logical group is indicated by a block 78. In addition, predefined steps (not shown) may be represented.

Referring again to FIG. 1, the test framework 10 provides a flow editor via the graphical user interface 30. Using the editor, the user can use drag and drop techniques to move actions from groups, or use predefined steps to create a desired flow.

The server 14 includes a server having a file called "TC_actions.XFL", which contains basic actions. These are listed below in Table 2. The file TC_actions.XFL can be edited by the administrative operators 28, who can add other XFL files, and may also add Perl scripts that implement the actions found in the XFL files. These files are combined to create the actions pool 64 that is displayed in FIG. 5.

KPI's, which are disclosed in further detail hereinbelow, can be added to Perl scripts by the administrator. This usually results in an API being called that adds KPI's of interest to a result file. Normally such KPI's are also included in a KDL file, which is described below.

Example 2

The follow code fragment is a commented XFL example of an action. Default names in such XFL code are editable by the user.

```
<Action
    label="Backup and Analyze Logs"
    <!-- A descriptive name for the action-->
    enable="1"
    <!-
    Enable=0 means that the action is disabled,
    and will be skipped
    -->
    description=
    "Analyze and Backup logs and searches for errors"
    <!-
    Description of the use and meaning of the action
    -->
    script=
    "$landscape->BackupAndAnalyzeLogs(param,
    param, param )"
    <!-
    Perl syntax, which implements this action.
    Can receive params that are described as action children
    nodes in XML
    -->
    >
    <Param label="Logs Patterns"
    Value="Error Failed EXCEPTION Exception"
    description="Fill which words to search in the log files"
    type="String"/>
    <!-
    One of the parameters that will go in the script
    -->
    <Param label="Work Logs Patterns"
    Value="Error Warning Failed died failed ERROR
    warning Fatal FATAL FAILED"
    description="Fill which words to search
    in the work log files" type="String"/>
        <Param label="Exclude File Patterns"
    type="String"
    Value="responses"
    <!-- default name for the parameter-->
    description="Fill which files to skip in the log folder"/>
</Action>
```

Project Properties

The wizard then invites the user to assign properties to the new flow. Some options offered are as follows:

"Send email notification when done running" for receiving e-mail at the end of the each running of a flow, "Don't overwrite previous results". If not selected, each run will overwrite the results of the previous run. Optionally, emails may be directed to a user-defined distribution list. Links may be included to obtain direct comparison with a selected number of previous results.

An option "Schedule to run at:" allows runs to be scheduled.

Finally, the wizard invites the user to add an optional description of the project.

Project Execution

Continuing to refer to FIG. 1, the execution engine 32 scans an internal database and determines that a project is scheduled to run. It then creates an instance of a "scenario" object (implemented by a module "scenario.pm"), which, based on the information created using the wizard, defines the landscape and conditions on which the test is to be run. The execution engine 32 then dynamically creates a Perl script ("dynamicscript.pl"), which actually runs the flow on the defined landscape and under the conditions defined. Because the script dynamicscript.pl is generated dynamically, some changes in the environment that may have occurred between runs are automatically accommodated.

Execution of a project by the execution engine 32 is accompanied by the generation of a report. The test framework 10 provides a screen display illustrating summary results of a project run. It is possible to observe in detail the history and analysis of the flow, for example, the fact that particular steps of the flow were successfully executed. An option to invoke the analysis module 36 to analyze results, such as LoadRunner results, is discussed below.

Figure 8:
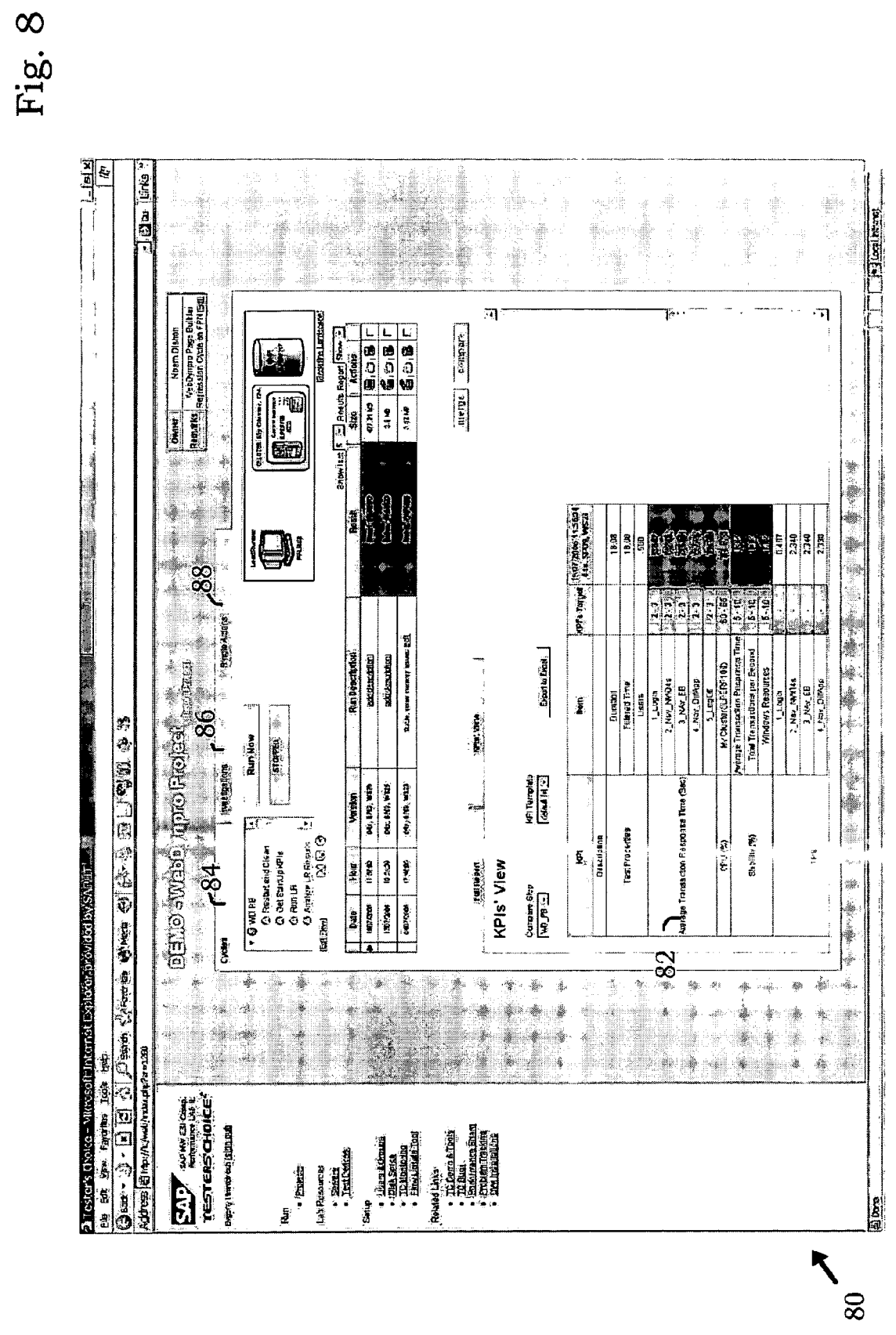

Many useful views of data measured during a project run are generated by the test framework 10. Reference is now made to FIG. 8, which is a screen display 80 illustrating a collection of key performance indicators that were measured during a project run, in accordance with a disclosed embodiment of the invention. An entry 82 indicates the average transaction response time of different user dialog steps simulated by LoadRunner. FIG. 8 also illustrates another feature of the test framework 10 (FIG. 1), namely the capability for the user to change modes of operation. It will be recalled that a project can be operated in a cyclical mode, an investigative mode, and a single action mode. Any of these modes can be enabled by respectively selecting a cycle tab 84, an investigation tab 86 or a single action tab 88.

Figure 9:
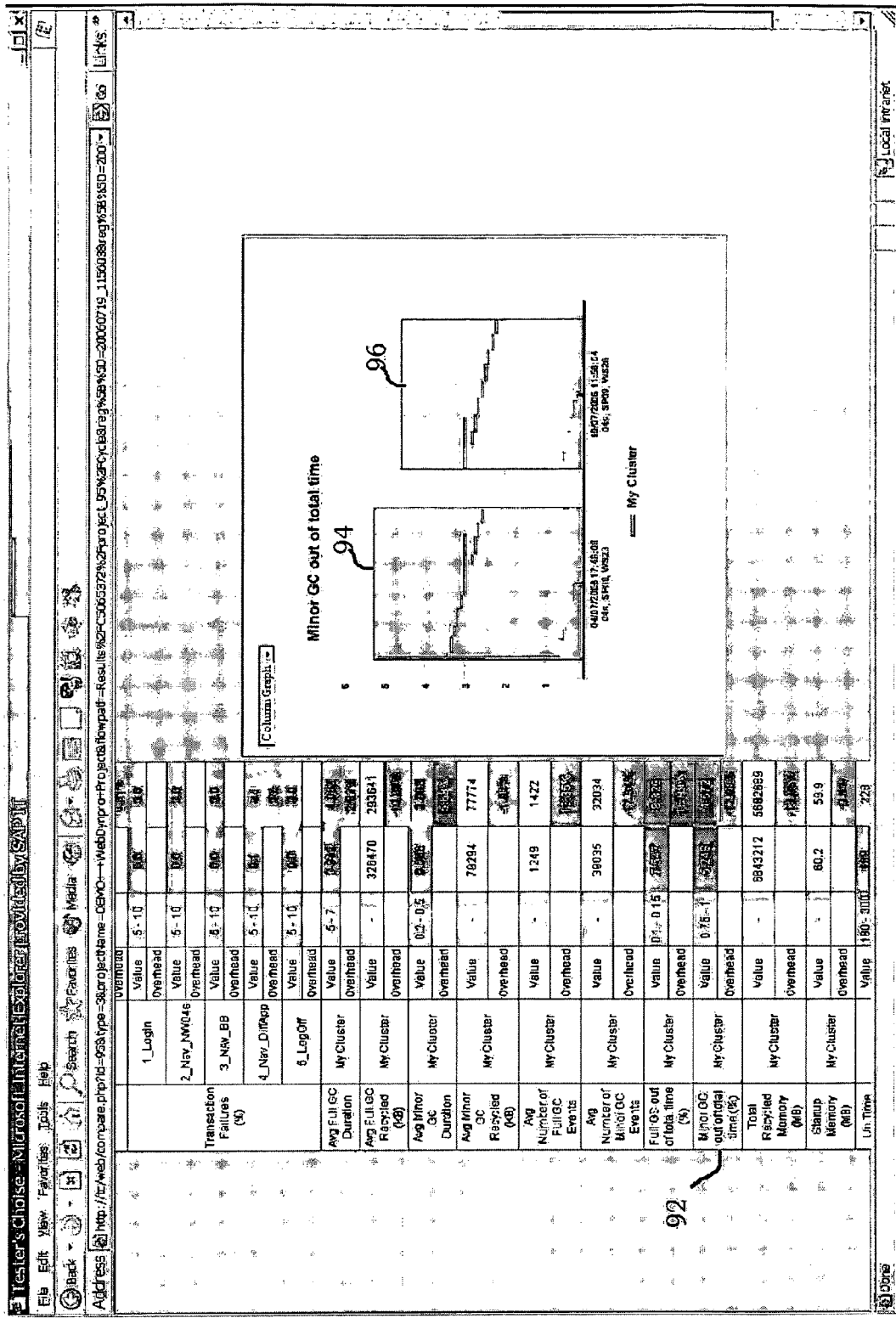
FIG. 9 is a screen display in which aspects of two runs of the same project are presented in a side-by-side comparison, in accordance with a disclosed embodiment of the invention.

Data from different runs may be compared. Reference is now made to FIG. 9, which is a screen display 90 in which aspects of two runs of the same project are presented in a side-by-side comparison, in accordance with a disclosed embodiment of the invention. A key performance indicator 92 (minor garbage collection (GC) out of total time) has been selected. A bar graph 94 and a bar graph 96 show values of the performance indicator 92 that were observed during performances on Jul. 4, 2006 and Jul. 19, 2006, respectively.

When a flow is executed, a result folder is created. This contains all the logs and reports that were generated and collected during the run, e.g., J2EE logs, LoadRunner (LR) reports, and other analyses.

Scheduler

The test framework 10 provides a scheduler for executing a project run at a future time or repeatedly at intervals.

An option "Action Backup and Analyze Logs" (not shown) is available. This option allows the user to view a detailed analysis of the logs produced on the landscape during the current run. It is also possible to view the detailed messages, e.g., errors, and exceptions. Original log files may be conveniently accessed using links.

Project Analysis

Crash Detection and Thread Dump

From the actions pool 64 (FIG. 5), the user may select an option "Run Monitored LoadRunner" (not shown). The user is generally required to supply a LoadRunner scenario. The test framework 10 automatically modifies the scripts of the LoadRunner scenario so that periodically during the run, LoadRunner reports current response times and the number of failed transactions to the server 14 (FIG. 1).

When a combination of failed transaction and response time exceeds a predefined limit, an impending "crash" situation is identified. The test framework 10 responsively generates thread dumps, and backs up the server logs and garbage collection logs of the affected server, all automatically, and just prior to an actual crash.

A summary crash detection report occurring during an execution of a project in a monitored mode is available, in which certain configuration information regarding the crash detector, and information concerning crashes are displayed. Links to a full report are provided.

Additionally or alternatively, using the crash detection facility, a thread dump interval can be set. Thread dumps are descriptions of thread actions in a running Java Virtual Machine (JVM). Using a built-in API of the J2EE engine, the test framework 10 (FIG. 1) produces the thread dumps, which can later be analyzed in order to detect abnormal conditions in the JVM.

In one aspect of the invention, the test framework 10 harnesses the facilities of third party tools, e.g., LoadRunner, which is adapted to performance analysis. If an option is selected, LoadRunner results of a project run relating to transaction response time are imported and summarized. It is possible to access the original LoadRunner Report, which may contain information that is more detailed.

As another example or performance analysis, the test framework 10 (FIG. 1) can organize and present memory utilization data that were measured during a project run. An option "Action Backup and Analyze GC Logs" (not shown) is available. Selection of this option enables aspects of memory behavior during the project run to be viewed.

Figure 10:
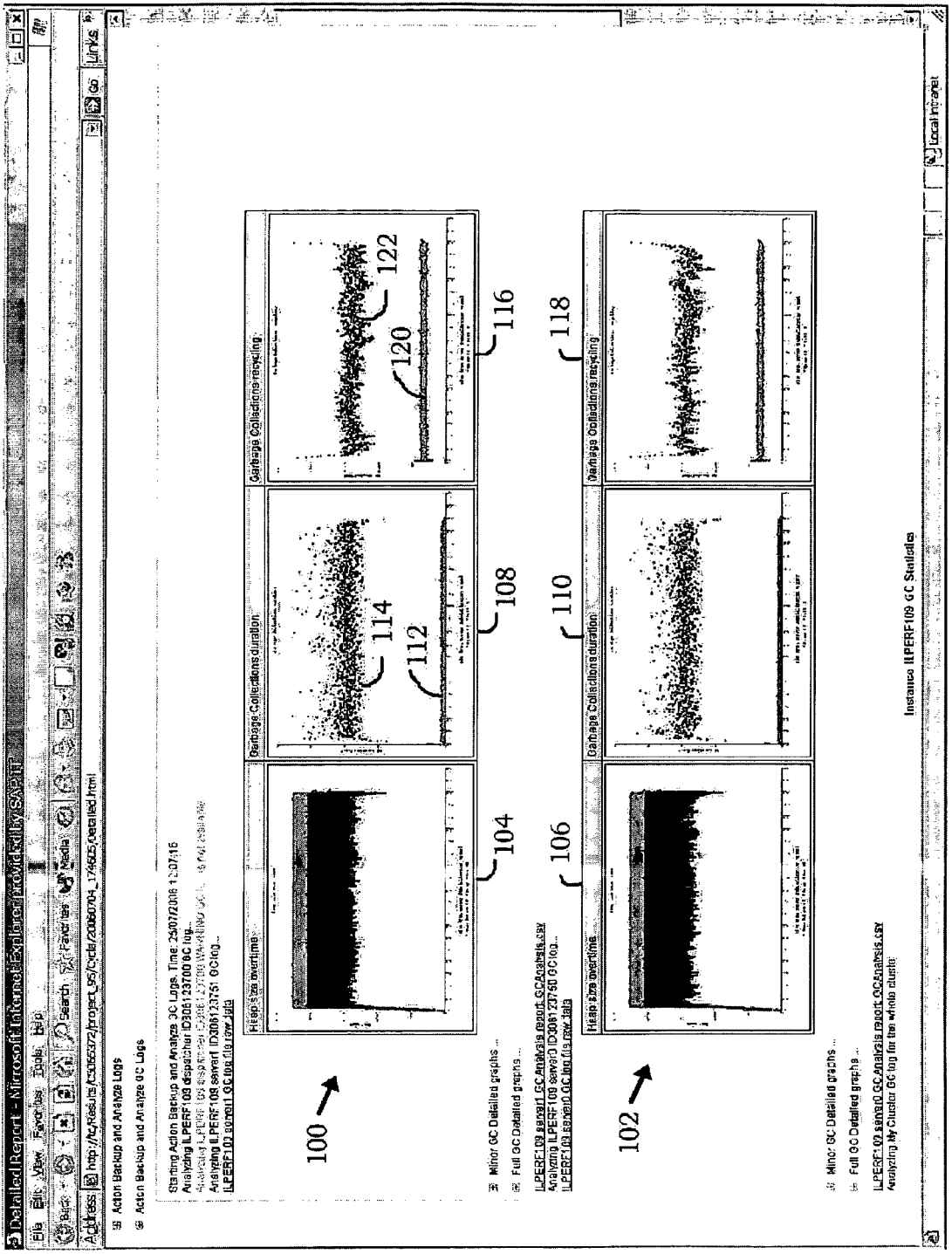
FIG. 10 is a screen display that presents garbage collection activity occurring during an execution of a project, in accordance with a disclosed embodiment of the invention.

Reference is now made to FIG. 10, which is a screen display 98 that presents garbage collection activity occurring during an execution of a project, in accordance with a disclosed embodiment of the invention. Assume that the landscape configuration chosen for the project includes one or more application servers that handle client requests, and a dispatcher server that dispatches client requests to the application servers. This configuration is used, for example, in versions of the J2EE engine. The screen display 98 presents series 100, 102 of three graphs for an application server. Although not shown on the screen display 98, respective series of graphs are displayable for each application server in the system being evaluated.

Leftmost graphs 104, 106 in the series 100, 102 present heap size plotted against elapsed time during the run. This graph presents two states of the heap: before and after garbage collection. This graph may display problematic memory behavior that can lead to an out-of-memory crash. Observation of an unchanged heap size before and after garbage collection, or observation of a constantly increasing heap size over time are other indications of memory allocation problems. It should be noted that this memory analysis is the result of the action 74 (Backup and Analyze GC Logs) (FIG. 5), which was included in the flow that produced the results shown in FIG. 10. If a crash protect option is selected, the analysis is performed automatically upon detection of a system crash.

Center graphs 108, 110 display garbage collection duration These are composite displays in which minor garbage collection and full garbage collection data appear as bands 112, 114, respectively. The graphs 108, 110 are interpreted by correlation with corresponding rightmost graphs 116, 118, which display recycled bytes. In the graphs 116, 118, recycled byte data from minor garbage collection and full garbage collection appear as bands 120, 122, respectively. The series 102 is similar. In general, the more recycled bytes, the longer the garbage collection duration. The finding of a small number of recycled bytes when the system is under memory load may be an indication of malfunctioning garbage collection, which may lead to an out-of-memory crash.

While not shown in FIG. 10, another performance indicator that can be displayed is the total response time during browser navigation during the test. This performance indicator is a KPI that can be extracted from LoadRunner results. It is one of the most important, as it closely relates to user satisfaction.

The test framework 10 (FIG. 1) is also capable or reporting garbage collection data and statistics in tabular form both for a cluster globally and per server node.

The use of class histograms is a useful way to monitor memory consumption of classes. Memory consumption for every class in use may be presented on a class histogram upon a thread dump. The histograms resulting from different thread dumps may be compared, thereby following memory behavior for every class. Using this facility memory leaks can be localized to specific classes. Class histograms are produced by the test framework 10 using a built-in API of the J2EE server, and are analyzed by the analysis module 36 (FIG. 1). This aspect of the analysis is a result of an action Analyze Class Histogram (not shown) selected from the actions pool 64 (FIG. 5).

Figure 11:
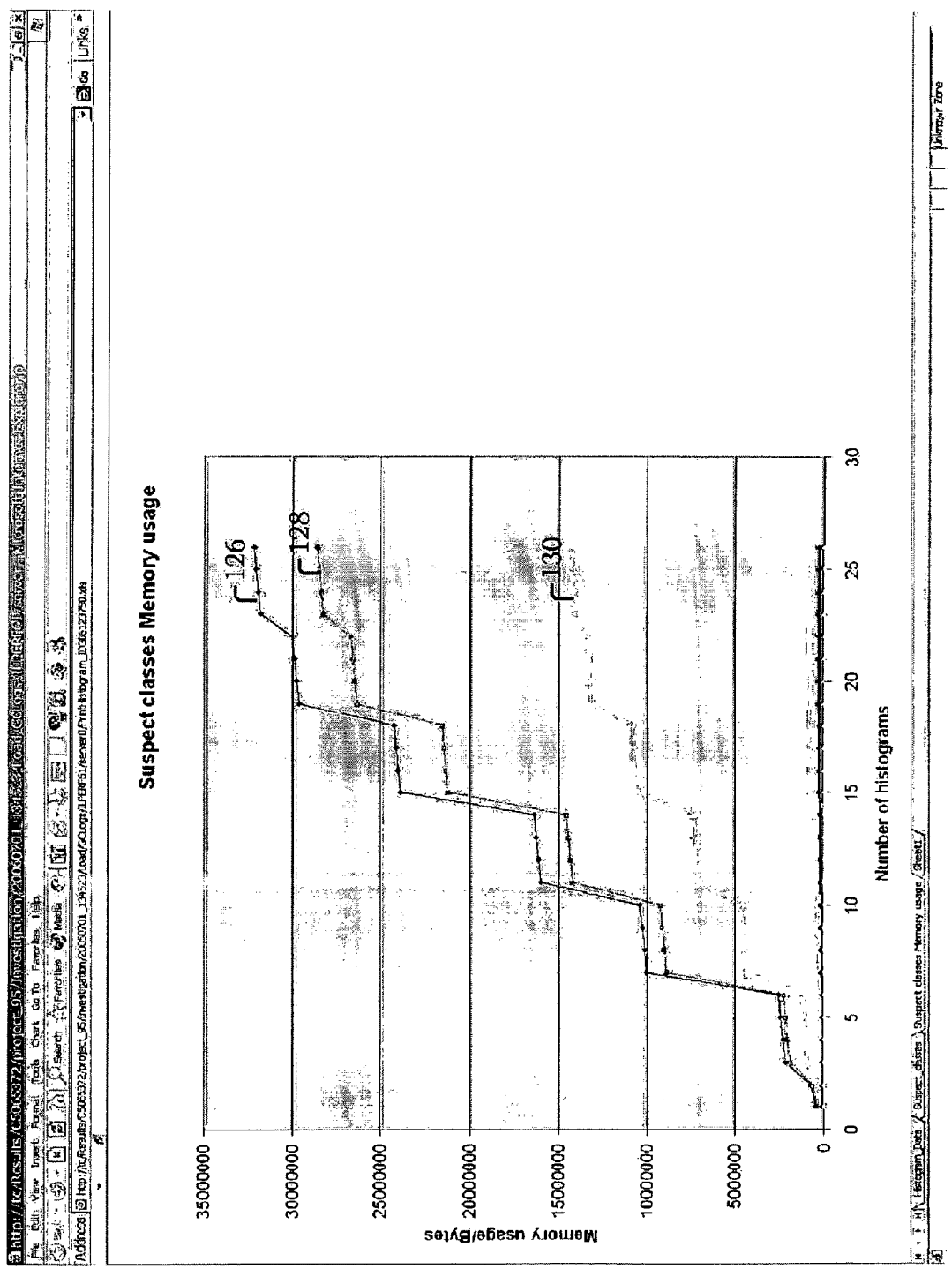
FIG. 11 is a screen display that presents a series of class histogram produced during execution of a project, in accordance with a disclosed embodiment of the invention.

Reference is now made to FIG. 11, which is a screen display 124 that presents a series of several class histogram produced during execution of a project, in accordance with a disclosed embodiment of the invention. The memory usage of three suspect classes is indicated by lines 126, 128, 130 at different times during a project run. A generally increasing memory usage is observed for each of these classes.

Results Merger

In the course of operation a number of separately obtained results are more conveniently presented together. The test framework 10 (FIG. 1) provides a "Merge Results" feature that enables different steps to be consolidated on one result line.

Figure 12:
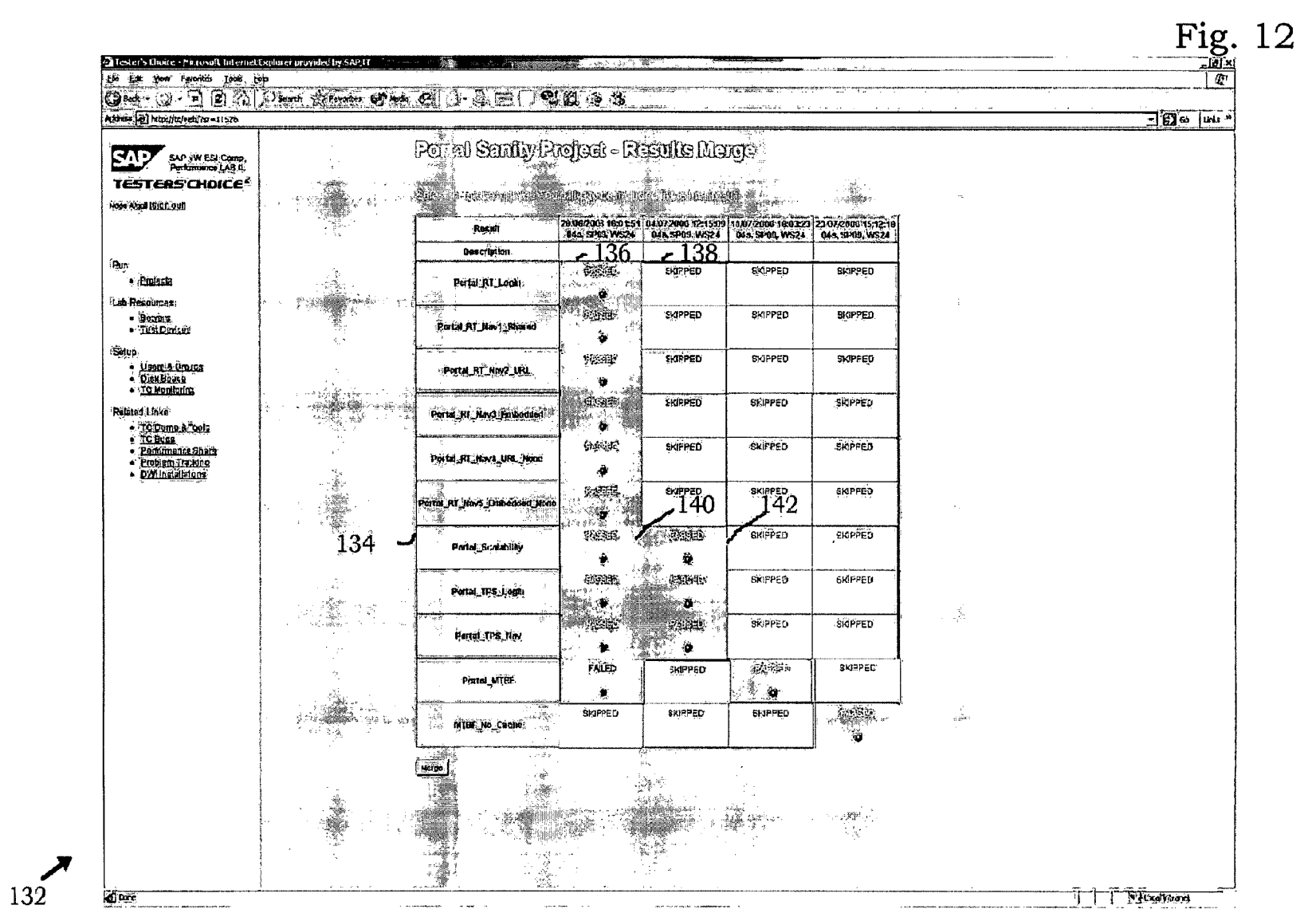

Reference is now made to FIG. 12, which is a screen display 132 showing details of four project runs, in accordance with a disclosed embodiment of the invention. The screen display 132 further indicates a user selection of a portion of the results of different runs. Results indicated as "skipped" were not selected. All other results were selected. The selected results are then presented in tables or graphs with comparisons as appropriate. For example, results corresponding to a box 134 ("portal scalability") have been selected from two runs indicated by columns 136, 138, and shown by boxes 140, 142, respectively. These results are typically presented together in a graph or table.

General Operation

Figure 13:
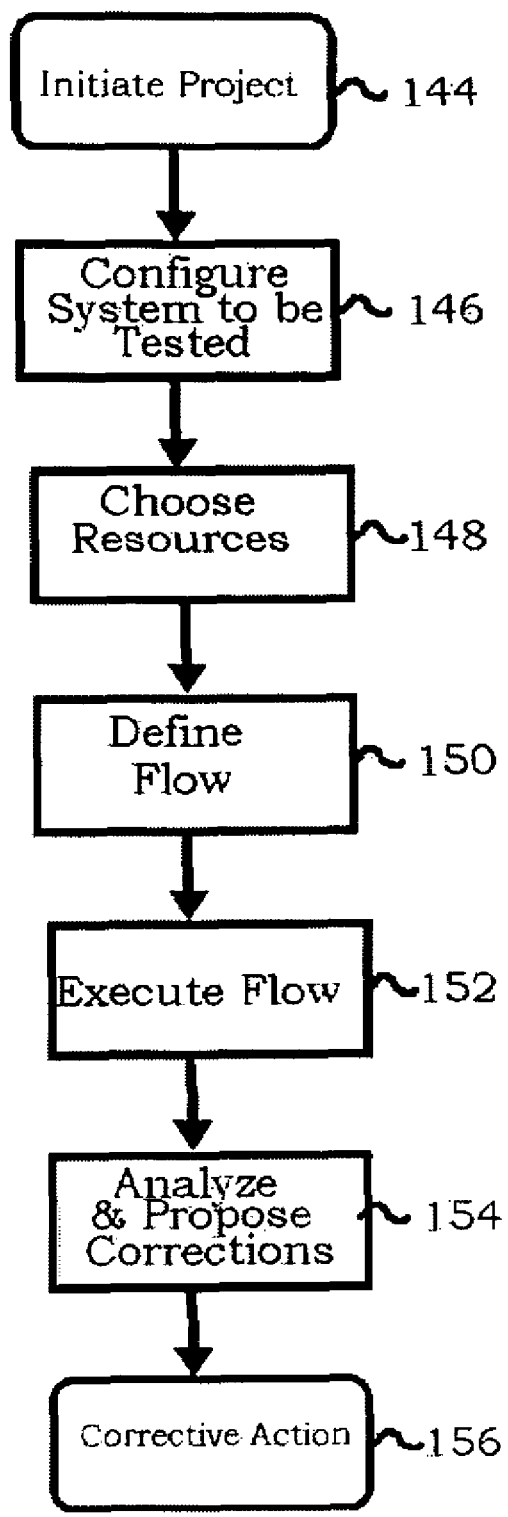
FIG. 13 is a flow chart of a method for evaluating the performance of complex software systems, in accordance with a disclosed embodiment of the invention.

Reference is now made to FIG. 13, which is a flow chart of a method for evaluating the performance of complex software systems, in accordance with a disclosed embodiment of the invention. At initial step 144, definition of a new project is initiated, typically using the services of a wizard or similar program.

Next, at step 146, the configuration of the data processing system to be tested is determined. This involves defining the network topology of and selecting network elements of the data processing system in the network topology. These elements may include servers, client work groups, and network routine elements. Essentially, this step is a definition of the system landscape.

Next, at step 148, resources required to execute the test cycle are selected. Various third party tools, such as the above noted LoadRunner performance tool, may be recruited for use.

Next, at step 150, test flow, e.g., a sequence of actions are chosen. These actions may control the resources selected in step 148, as well as the elements chosen in step 146. Scheduling issues are typically addressed at this step. For example, the test cycle may be automatically iterated at predefined intervals.

Next, at step 152, the performance test is executed one or more times. Performance indicators are recorded, as described above.

Next, at step 154, the recorded performance indicators are analyzed. Visual presentations, e.g., tables and histograms are prepared.

At final step 156, the data prepared in step 154 is evaluated by a human operator. Corrective action is initiated as required.

Example 3

Computer Program Listing Appendix 1 is an example of a flow created by a user using an extended flow language, which is an extension of XML. Key performance indicators of interest defined by the user are stored in a KDL file, an example of which is presented in Computer Program Listing Appendix 2. This file contains KPI descriptions, ranges, and degradation conditions. Computer Program Listing Appendix 3 contains a file in which KPI's to be included in reports are set by the user. Computer Program Listing Appendix 4 is an exemplary result file.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

APPENDIX 1

TABLE 2

| | Actions | |
|---|---|---|
| Group | Action | Description |
| LoadRunner and QTP | Run LR | Action to run a ready made LoadRunner scenario |
| | Run Monitored LR | Action to run a ready made LoadRunner scenario with Testers'Choice monitoring |
| | Run QTP | Action to run a ready made QTP scenario |
| | Analyze LR Results | Automatically analyze LoadRunner results after load test. In case |

TABLE 2-continued

Actions

| Group | Action | Description |
|---|---|---|
| | | you need to analyze old results, use the action from 'Offline Utilites' |
| NetWeaver J2EE | Stop | Stops the J2EE instances in all the landscape |
| | Start | Starts the J2EE instances in all the landscape |
| | Restart | restart the system |
| | Clean | Delete all logs |
| | Restart and Clean | Restart the system and delete all logs |
| | Take ThreadDump | Take a thread dump from each server in the landscape |
| | Get Startup KPIs | Get Startup time KPI and Startup Memory KPI for the entire landscape |
| | Get End Memory KPIs | Get Left Over Memory KPI and Total Recycled Per Login for the entire landscape |
| | Backup and Analyze Logs | Analyze and Backup logs and searches for errors |
| | Analyze Class Histogram | Analyze gc log class histograms and produce a report with graphs and suspected classes |
| | Backup Instance Logs | Backup all system logs |
| | Backup Work Logs | Backup all system work logs |
| Utilities | GoTo Sleep | Creates a delay of X Seconds in the execution of the flow at the inserted point |
| | Send me Email | Sends an Email to the owner of the project |
| | Run CMD in LR Machine | Run any dos command, batch or executable |
| | Run CMD in TC server | Run any dos command, batch, Perl or executable |
| Admin Actions | Archive Old Projects | Scan all result folders in all folders and zips those older then X days |
| | Check Disk Usage | Check current disk usage, create a report and email users whos disk quota is too big |
| | Maintain DB | Deletes unused landscapes from DB |
| | Collect Servers Data | Collect Servers Data |
| Offline Utilities | Analyze Offline SAP Logs | Analyze logs and searches for errors |
| | Analyze Offline GC Logs | Analyze GC logs |
| | Analyze Offline Class Histogram | Analyze ClassHistogram |
| | Analyze Offline LR Results | Analyze LR test of old results already on disk |

TABLE 3

Key Performance Indicators

| Area | KPI Name | Explanation |
|---|---|---|
| Load Runner | CPU Usage (%) | |
| | LoadRunner Transaction Failures (%) | |
| | LoadRunner Average Transaction Response Time (Sec) | |
| | LoadRunner TPS | |
| | LoadRunner Stability (%) | Standard deviation of the following LoadRunner graphs: CPU usage TPS Response time Meaning: How stable and flat are these graphs |
| | CPU per Dialog Step (ms) | |
| | CPU Load Balancing (%) | Value between 0% to 100% represents the Standard deviation between CPU time on different Nodes in the cluster |
| Memory | Full/Minor GC Duration (Avg.) | |
| | Full/Minor GC Events | |
| | Full/Minor GC out of total time (%) | |
| | Full/Minor GC Recycled (Avg.) (KB) | |
| | Total Recycled Memory | Total recycled bytes in Full GC and minor GC one hour after the scenario is stopped |
| Start Up KPI | Startup Memory Heap (MB) | Start Up Heap Memory after restart |
| | Startup Perm (MB) | in case Perm is defined in the GC log (see Perm Size KPI section) |
| | Startup Time (Sec) | Start Up Heap Memory after restart |
| End KPIs End KPIs are taken twice: After the test has finished (before sessions has expired) Waiting one hour until sessions will expired and triggering 5 FGC for each server and taking the leftover of the memory | Finish Memory | Heap memory at the end of the test |
| | Leftover Junk Memory | One hour after the Scenario is stopped, take last row in GC.log after FGC (on both server nodes) |
| | Memory per Transaction | Total recycled bytes divided by the number of transactions |
| | Memory per User in Defined Scenario | Total recycled bytes divided by number of LOGIN transactions |
| | Total Recycled Memory | Total recycled bytes in Full GC and minor GC one hour after the test is stopped |
| Logs | Log Folders Size (MB) | Size of the analyzed server logs |
| J2EE | Nodes Restart (#) | based on the server logs |

The invention claimed is:

1. A computer-implemented method for automatically testing computer system performance, comprising the steps of:

using a graphical user interface, establishing a configuration of a data processing system to be tested, said configuration comprising a network topology and network elements of said data processing system in said network topology;

with said graphical user interface selecting resources for testing said data processing system;

with said graphical user interface defining a testing cycle for said configuration at least in part by identifying key performance indicators in a key performance indicator description language, said testing cycle comprising a series of actions;

automatically controlling said resources to obtain recorded performance indicators of said data processing system while executing said testing cycle using said configuration of said data processing system;

automatically analyzing said recorded performance indicators; and generating a visual presentation of said performance indicators responsively to said step of analyzing.

2. The method according to claim 1, wherein executing said testing cycle comprises detecting a system crash.

3. The method according to claim 1, wherein said step of executing said testing cycle is iterated, and said step of automatically analyzing comprises comparing results of said iterations thereof.

4. The method according to claim 1, wherein executing said testing cycle comprises detecting an abnormal condition; and responsively thereto performing a predefined sequence of actions.

5. The method according to claim 4, wherein said predefined sequence of actions comprises a thread dump.

6. The method according to claim 1, wherein defining a testing cycle further comprises stating said series of actions in an extendible flow language.

7. The method according to claim 1, wherein establishing a configuration of a data processing system comprises automatically mapping machines and server instances participating in a cluster of said data processing system.

8. A computer software product for automatically testing system performance, including a tangible computer-readable medium in which computer program instructions are stored, which instructions, when read by a computer, cause the computer to:

accept via a graphical user interface a configuration of a data processing system to be tested, said configuration comprising a network topology and network elements of said data processing system in said network topology;

via said graphical user interface accept a selection of resources for testing said data processing system;

via said graphical user interface accept a definition of a testing cycle for said configuration, said testing cycle comprising a series of actions and said definition comprising an expression of key performance indicators in a key performance indicator description language;

automatically control said resources to obtain recorded performance indicators of said data processing system while executing said testing cycle using said configuration of said data processing system;

automatically analyze said recorded performance indicators; and generate a visual presentation of said performance indicators responsively to an analysis of said recorded performance indicators.

9. The computer software product according to claim 8, wherein said step of executing said testing cycle is iterated, and an automatic analysis comprises a comparison of results of said iterations thereof.

10. The computer software product according to claim 8, wherein executing said testing cycle comprises detecting an abnormal condition; and responsively thereto performing a predefined sequence of actions.

11. The computer software product according to claim 10, wherein said predefined sequence of actions comprises a thread dump.

12. The computer software product according to claim 8, wherein said definition of a testing cycle further comprises an expression of said series of actions in an extendible flow language.

13. The computer software product according to claim 8, wherein said configuration of said data processing system comprises an automatic mapping of machines and server instances participating in a cluster of said data processing system.

14. An automated framework for testing system performance, comprising:

a memory having objects stored therein, said objects comprising a network interface to a data network, a graphical user interface, a project definition module an analysis module and an execution engine;

a processor linked to said memory and to said data network via said network interface, said processor operative to:

invoke said project definition module to accept via said graphical user interface a configuration of a data processing system to be tested, said configuration comprising a network topology and network elements of said data processing system in said network topology and accept a selection of resources for testing said data processing system;

via said graphical user interface accept a definition of a testing cycle for said configuration, said testing cycle comprising a series of actions and said definition comprising an expression of key performance indicators in a key performance indicator description language;

automatically invoke said execution engine to perform said testing cycle using said configuration of said data processing system to test said data processing system via said network interface and control said resources to obtain recorded performance indicators of said data processing system while executing said testing cycle automatically analyze said recorded performance indicators; and generate a visual presentation of said performance indicators responsively to an analysis of said recorded performance indicators.

15. The automated framework according to claim 14, wherein said execution engine is operative to iterate said testing cycle, and said analysis module is operative to compare results of said iterations thereof.

16. The automated framework according to claim 14, said execution engine is operative to detect an abnormal condition; and responsively thereto said processor is operative to perform a predefined sequence of actions.

17. A computer-implemented method for automatically testing computer system performance, comprising the steps of:

using a graphical user interface, establishing a configuration of a data processing system to be tested, said configuration comprising a network topology and network elements of said data processing system in said network topology;

with said graphical user interface selecting resources for testing said data processing system;

with said graphical user interface defining a testing cycle for said configuration, said testing cycle comprising a series of actions and said defining is performed at least in part by stating said series of actions in an extendible flow language;

automatically controlling said resources to obtain recorded performance indicators of said data processing system while executing said testing cycle using said configuration of said data processing system;

automatically analyzing said recorded performance indicators; and generating a visual presentation of said performance indicators responsively to said step of analyzing.

18. The method according to claim 17, wherein executing said testing cycle comprises detecting a system crash.

19. The method according to claim 17, wherein said step of executing said testing cycle is iterated, and said step of automatically analyzing comprises comparing results of said iterations thereof.

20. The method according to claim 17, wherein executing said testing cycle comprises detecting an abnormal condition; and responsively thereto performing a predefined sequence of actions.

21. The method according to claim 20, wherein said predefined sequence of actions comprises a thread dump.

22. The method according to claim 17, wherein defining a testing cycle further comprises identifying key performance indicators in a key performance indicator description language.

23. The method according to claim 17, wherein establishing a configuration of a data processing system comprises automatically mapping machines and server instances participating in a cluster of said data processing system.

24. A computer software product for automatically testing system performance, including a tangible computer-readable medium in which computer program instructions are stored, which instructions, when read by a computer, cause the computer to:
  accept via a graphical user interface a configuration of a data processing system to be tested, said configuration comprising a network topology and network elements of said data processing system in said network topology;
  via said graphical user interface accept a selection of resources for testing said data processing system;
  via said graphical user interface accept a definition of a testing cycle for said configuration, said testing cycle comprising a series of actions and said defining is performed at least in part by stating said series of actions in an extendible flow language;
  automatically control said resources to obtain recorded performance indicators of said data processing system while executing said testing cycle using said configuration of said data processing system;
  automatically analyze said recorded performance indicators; and
  generate a visual presentation of said performance indicators responsively to an analysis of said recorded performance indicators.

25. The computer software product according to claim 24, wherein said step of executing said testing cycle is iterated, and an automatic analysis comprises a comparison of results of said iterations thereof.

26. The computer software product according to claim 24, wherein executing said testing cycle comprises detecting an abnormal condition; and responsively thereto performing a predefined sequence of actions.

27. The computer software product according to claim 26, wherein said predefined sequence of actions comprises a thread dump.

28. The computer software product according to claim 24, wherein said definition of a testing cycle further comprises an expression of key performance indicators in a key performance indicator description language.

29. The computer software product according to claim 24, wherein said definition of a testing cycle further comprises an expression of said series of actions in an extendible flow language.

30. The computer software product according to claim 24, wherein said configuration of said data processing system comprises an automatic mapping of machines and server instances participating in a cluster of said data processing system.

31. An automated framework for testing system performance, comprising:
  a memory having objects stored therein, said objects comprising a network interface to a data network, a graphical user interface, a project definition module an analysis module and an execution engine;
  a processor linked to said memory and to said data network via said network interface, said processor operative to:
    invoke said project definition module to accept via said graphical user interface a configuration of a data processing system to be tested, said configuration comprising a network topology and network elements of said data processing system in said network topology and accept a selection of resources for testing said data processing system;
    via said graphical user interface accept a definition of a testing cycle for said configuration, said testing cycle comprising a series of actions and said defining is performed at least in part by stating said series of actions in an extendible flow language;
    automatically invoke said execution engine to perform said testing cycle using said configuration of said data processing system to test said data processing system via said network interface and control said resources to obtain recorded performance indicators of said data processing system while executing said testing cycle automatically analyze said recorded performance indicators; and
    generate a visual presentation of said performance indicators responsively to an analysis of said recorded performance indicators.

32. The automated framework according to claim 31, wherein said execution engine is operative to iterate said testing cycle, and said analysis module is operative to compare results of said iterations thereof.

33. The automated framework according to claim 31, said execution engine is operative to detect an abnormal condition; and responsively thereto said processor is operative to perform a predefined sequence of actions.

* * * * *